United States Patent
Stessen et al.

(10) Patent No.: US 7,050,114 B2
(45) Date of Patent: May 23, 2006

(54) PICTURE SIGNAL CONTRAST CONTROL

(75) Inventors: Jeroen Hubert Christoffel Jacobus Stessen, Eindhoven (NL); Age Jochem Van Dalfsen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 541 days.

(21) Appl. No.: 10/117,827

(22) Filed: Apr. 8, 2002

(65) Prior Publication Data

US 2003/0063221 A1    Apr. 3, 2003

(30) Foreign Application Priority Data

Apr. 11, 2001 (EP) .................. 01201334

(51) Int. Cl.
 *H04N 5/52* (2006.01)
(52) U.S. Cl. .................. 348/679; 348/603; 348/673; 348/675; 348/678; 348/686; 382/274; 345/604; 345/617
(58) Field of Classification Search ................ 348/603, 348/673, 675, 678–679, 686; 382/274; 358/1.9; 345/604, 614; H04N 5/52
See application file for complete search history.

(56) References Cited

U.S. PATENT DOCUMENTS

| 4,435,725 | A | | 3/1984 | Nagao et al. | |
|---|---|---|---|---|---|
| 4,803,548 | A | | 2/1989 | Kirk | |
| 4,941,111 | A | | 7/1990 | Sfarti | |
| 5,079,623 | A | * | 1/1992 | Sendelweck et al. | 348/678 |
| 5,349,390 | A | * | 9/1994 | Stessen et al. | 348/679 |
| 5,394,915 | A | * | 3/1995 | Takada | 152/209.1 |
| 5,452,017 | A | | 9/1995 | Hickman | |
| 5,548,330 | A | | 8/1996 | Hieda et al. | |
| 5,619,280 | A | * | 4/1997 | Yamashita et al. | 348/645 |
| 5,712,659 | A | * | 1/1998 | Adachi | 345/617 |
| 5,726,682 | A | * | 3/1998 | Lum et al. | 345/604 |
| 5,767,899 | A | | 6/1998 | Hieda et al. | |
| 5,940,144 | A | * | 8/1999 | Lenz et al. | 348/679 |
| 6,075,574 | A | * | 6/2000 | Callway | 348/673 |
| 6,177,962 | B1 | * | 1/2001 | Rumreich et al. | 348/648 |
| 6,653,991 | B1 | * | 11/2003 | Kim | 345/22 |
| 6,778,183 | B1 | * | 8/2004 | Nair et al. | 345/589 |
| 2002/0031277 | A1 | * | 3/2002 | Lubin et al. | 382/254 |
| 2002/0057375 | A1 | * | 5/2002 | Miyasaka et al. | 348/678 |
| 2003/0001975 | A1 | * | 1/2003 | Takeda et al. | 348/678 |
| 2003/0063221 | A1 | * | 4/2003 | Stessen et al. | 348/678 |

FOREIGN PATENT DOCUMENTS

| EP | 0382100 | | 8/1990 |
|---|---|---|---|
| EP | 0812107 | A1 | 6/1997 |

OTHER PUBLICATIONS

"Demo" developed by Christopher C. Yang; hhttp://ai.bpa.Arizona.edu/-chrisy/demo.html; pp. 1-2.

* cited by examiner

*Primary Examiner*—Brian Yenke
(74) *Attorney, Agent, or Firm*—Michael T. Ure

(57) ABSTRACT

The present invention relates to controlling contrast in at least part of a picture. The contrast control is performed by reducing the saturation (2–4) of the picture during contrast increase (1).

14 Claims, 6 Drawing Sheets

PICTURE SIGNAL CONTRAST CONTROL

FIELD OF THE INVENTION

The present invention relates to controlling the contrast in a picture signal.

BACKGROUND OF THE INVENTION

A video signal for use as input to an electronic video display consists of a number of sub signals, each sub signal representing color information for different areas of the picture, and the color information is represented by basic colors, i.e. RGB (red, blue, green) or YUV (luminance & chrominance).

If the viewer wants to amplify the contrast in a picture and thereby obtain a better light output from a display, this is done by boosting a weak signal (i.e. 50%) to nominal (i.e. 100%). There may still be 100% peaks in the signal that will now reach 200% of the permitted maximum level.

A problem with contrast amplification is that there is a contrast limit corresponding to the electronic video display or the D/A converter in the signal processor, meaning that the electronic video display is adapted to receive a limited range of input signals and the D/A converter in the signal processor is adapted to deliver a limited range of output signals.

These signal processors therefore comprise a variety of limiters for converting the signal range of the video signal to a signal range being within an acceptable range.

An embodiment of such a limiter is described un U.S. Pat. No. 5,349,390. U.S. Pat. No. 5,349,390 describes a device for reducing the amplitude range, which includes a first contrast reduction device receiving a picture signal for providing a contrast reduced picture signal; the contrast reduction device only reduces the contrast of the picture signal over the entire area when the picture signal exceeds a given first threshold (e.g. 90%) for relatively large areas. The picture signal processor also includes a second contrast reduction device, which supplements the first contrast reduction device and which provides the contrast reduced picture signal by immediately reducing the contrast of a too bright part of the first contrast reduced picture signal as soon and as long as an instantaneous amplitude of the first contrast-reduced picture signal exceeds a given second threshold (100%). This implementation is built with analog circuitry and is based on a feedback loop. Further an analog implementation is very cumbersome and noise sensitive, and it is hard to make adjustments for an optimum response. Further the picture might lose details in the bright areas because of the clipping of the small peaks.

SUMMARY OF THE INVENTION

It is an object of the present invention to solve the above mentioned problems and obtain a method making it possible to increase the contrast of a picture whereby maximum light output from the display is obtained. The invention is defined by the independent claims. The dependent claims define advantageous embodiments.

According to a first aspect, a method is obtained where it is possible to overdrive the picture signal and to obtain maximal light output from the display. The contrast may also be referred to as the amplitudes of the basic colors and the basic colors could e.g. be RGB, YUV. A video display device may be a computer monitor, television, projector etc.

The method may easily be implemented by digital circuits, whereby the advantages associated with digital circuits may be obtained.

By splitting the sub signal and reducing the chrominance followed by a reduction of the total color information an advantageous method may be obtained making it easy to implement and perform first the desaturation and then the contrast reduction.

The step of splitting the sub signal into two groups of picture information may comprise the step of splitting the selected sub signal into at least two groups of color information comprises the step of transforming the selected sub signal from being represented by the first set of basic colors to a second set of basic colors—e.g. U, V and Y.

Thereby the splitting is a very easy task since UV represents the chrominance and Y only represents luminance.

The first value may be determined by multiplying the reciprocal of the amplitude of that basic color having the highest amplitude and being above the predefined value with the predefined value, and wherein the reduction of saturation is performed by multiplying the amplitudes of the signals of the first group of sub signals with the first value.

The second value may be determined by multiplying the reciprocal of the amplitude of that basic color having the highest amplitude and being above the predefined value with the predefined value, and wherein the reduction of all basic colors is performed by multiplying the amplitudes of the signals of both the first and second group of sub signals with the second value.

Thereby, so-called hard clipping may be obtained, resulting in that the amplitudes of the basic colors never exceed a maximum value. This is typically used to clip in small peaks in the picture such as subtitles.

Alternatively the first and/or said second value may decrease from 1 to a limit value. The limit value may be determined by multiplying the reciprocal of the amplitude value of the basic color having the highest amplitude with said predefined value. Thereby, softer clipping is obtained which i.e. could be used instead of hard clipping in larger areas of the picture in order to avoid distortion of these areas, i.e. areas such as faces.

According to the invention the reciprocal of the amplitude value of the basic color having the highest amplitude may be defined in lookup tables. Alternatively, the first and second values may be defined in lookup tables. Thereby the soft clipping may be easy to implement. The lookup table may be implemented as a combination of at least one sparse table and at least one linear interpolator.

The steps of performing the reduction of saturation and performing the reduction of all basic colors may be performed in a small insignificant part of the picture in which at least one amplitude of the basic colors exceeds the predefined value. These small areas could i.e. be subtitles.

Contrast reduction of a small insignificant part may be combined with contrast reduction of a large significant part of the picture in which at least one amplitude of the basic colors exceeds the predefined value. These large areas could i.e. be faces.

The means recited in the signal processing device claim may be computer means, such as a CPU. The CPU could be customized, but it could also be a more general pre-programmed CPU. Other examples could be a digital signal processor (DSP) or other digital logic.

These and other aspects of the invention will be apparent from and elucidated with reference to the embodiments described hereinafter.

BRIEF DESCRIPTION OF THE DRAWINGS

The present invention will now be explained in further detail with reference to the accompanying Figures in which

FIG. 4A shows the output signal as a function of the largest input signal, and FIG. 4B shows the multiplication factor as a function of the largest input signal;

DETAILED DESCRIPTION OF THE INVENTION

According to the present invention an advantageous method of controlling contrast in at least a group of sub signals in a picture (such as signal peaks) is by consecutively following the steps of:

1. Reducing the saturation of the sub signals, i.e. by reducing the amplitude of those basic colors (U&V) in the sub signal to influence saturation of the picture.

Due to the violation of the "constant luminance principle", a reduction of the saturation will make red and blue seem darker and cyan and yellow seem brighter. Therefore, although the amplitude of the largest of the 3 signals is reduced, reducing the saturation even increases the contrast.

2. Reducing the contrast of the sub signals, i.e. by reducing the amplitude of all the basic colors (RGB or YUV) in the picture to influence contrast of the sub signals.

This reduces the intensity.

A third step could be introduced as a supplement to the above steps. This step reduces the contrast of the entire picture, if the picture contains large bright areas, such as faces. Thereby clipping is avoided in large areas, preventing especially loss of detail in facial texture. In an alternative embodiment these larger bright parts or even the total picture could be contrast reduced by the above steps.

Figure 1:
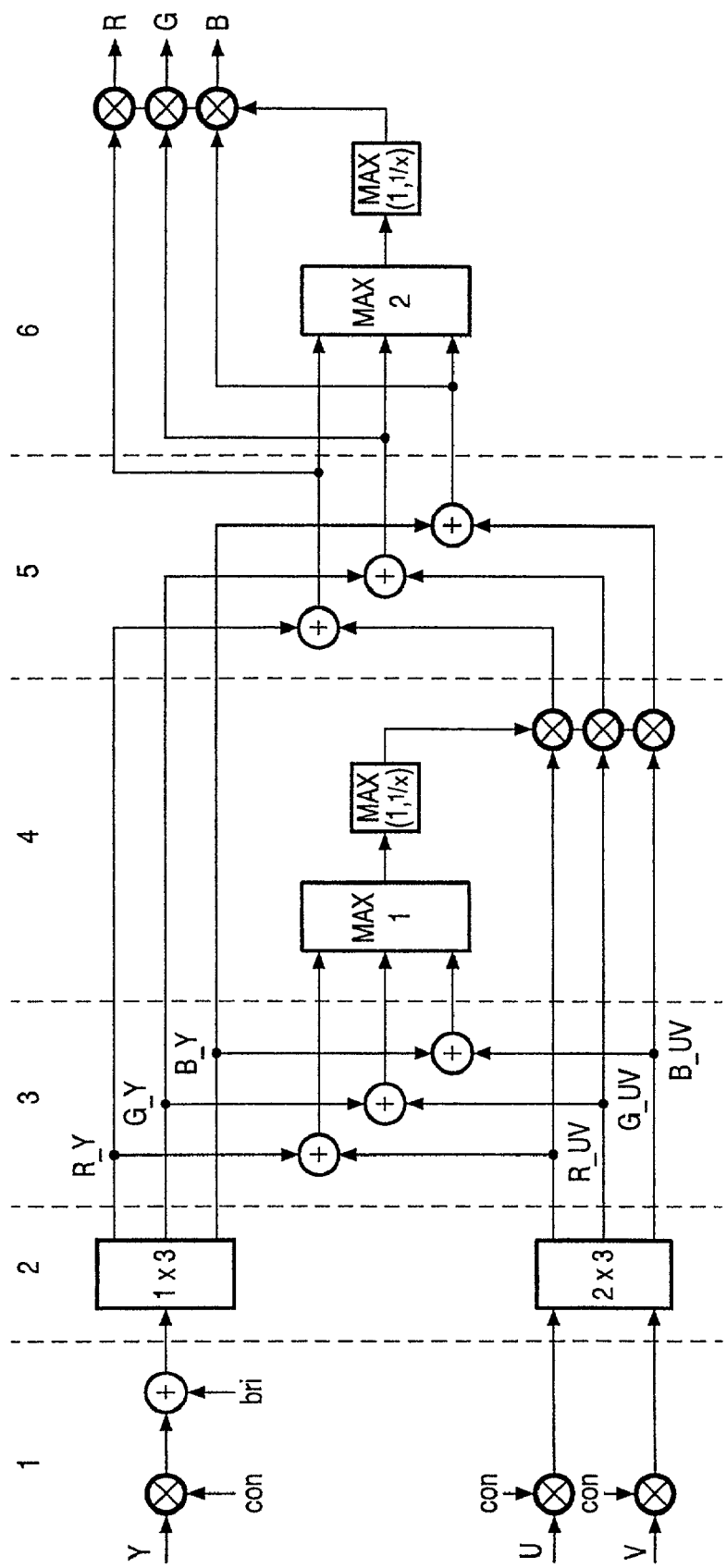
FIG. 1 shows a block diagram of an embodiment of the clipper for small areas of the present invention.

In the following an example of an embodiment of the peak clipping according to the present invention is described according to FIG. 1. Each step in FIG. 1 is described below:

1. The input sub signal is represented by the YUV color space, and these signals can be changed in contrast or brightness. Change of contrast multiplies YUV with a gain factor (con) and change of brightness adds an offset term (bri) to Y. This change in contrast and brightness is the main reason why the output signal may be too large and clipping of the (white) peaks may be necessary.

2. The YUV colors are converted to RGB according to the following conversion matrix:

$$\begin{bmatrix} R \\ G \\ B \end{bmatrix} = \begin{bmatrix} +1.000 & +0.000 & +1.402 \\ +1.000 & -0.344 & -0.714 \\ +1.000 & +1.772 & +0.000 \end{bmatrix} * \begin{bmatrix} Y \\ U \\ V \end{bmatrix}$$

This can be rewritten as (comprising an 1×3 and a 2×3 matrix in FIG. 1):

$$\begin{bmatrix} R \\ G \\ B \end{bmatrix} = \begin{bmatrix} +1.000 \\ +1.000 \\ +1.000 \end{bmatrix} * [Y] + \begin{bmatrix} +0.000 & +1.402 \\ +0.344 & -0.714 \\ +1.772 & +0.000 \end{bmatrix} * \begin{bmatrix} U \\ V \end{bmatrix}$$

The above form separates the contributions from the luminance channel (Y) and the chrominance channel (U&V) to the RGB color space. Both channels are related to contrast, but only the chrominance channels relate to saturation, and therefore it is now possible to control the saturation separately by first adjusting the amplitude of the contribution from the chrominance channel. Therefore the RGB contribution to Y and UV can be separated as shown below:

$$\begin{bmatrix} R\_UV \\ G\_UV \\ B\_UV \end{bmatrix} = \begin{bmatrix} +0.000 & +1.402 \\ +0.344 & -0.714 \\ +1.772 & +0.000 \end{bmatrix} * \begin{bmatrix} U \\ V \end{bmatrix}$$

$$\begin{bmatrix} R\_Y \\ G\_Y \\ B\_Y \end{bmatrix} = \begin{bmatrix} +1.000 \\ +1.000 \\ +1.000 \end{bmatrix} * [Y]$$

3. The total RGB signal is obtained by adding R_Y to R_UV, G_Y to G_UV and B_Y to B_UV.

$R = R\_Y + R\_UV$ $G = G\_Y + G\_UV$ $B = B\_Y + B\_UV$

4. It is determined if the amplitude of one of the basic colors RGB is above a predefined value. If this is the case, a first overdrive factor is determined. This first overdrive factor is determined according to a maximum value for each basic color RGB; i.e. the value could be set according to a limit, such as a maximum contrast value to be used in the video display without overdriving the display, or according to an input limit to the video display specified by the manufacturer of the display adapter.

If one of the basic colors in a sub signal is above the predefined value, then the amplitude of all the basic colors in the sub signal(s) is reduced according to the present invention by reducing only the U and V part or the saturation part of the sub signal(s) with the first overdrive factor (by multiplying the basic colors with the overdrive factor 1/x). The amplitude of the smallest signal(s) of the RGB sub signals may be increased, but this is not a problem.

5. After reducing the U and V channels, the total RGB signal is calculated again by adding the Y part and the reduced UV part of the RGB signal as stated above.

6. The total RGB signal is then reduced with a second overdrive factor. Again it is determined if the amplitude of one of the RGB sub signals is above a predefined value. If this is the case, then they are reduced with a second overdrive factor. Again the overdrive factor is determined according to the maximum value for each basic color RGB; i.e. the value could be set according to a limit, such as a maximum contrast value to be used in the video display without overdriving the display, or according to an input limit to the video display specified by the manufacturer of the display adapter.

If one of the RGB sub signals is above the predefined value, then the amplitude of all the signals is reduced according to the present invention by reducing all the YUV parts or the contrast part of the RGB sub signals with the second overdrive factor.

7. After reducing the YUV channel, the total RGB signal is calculated again by adding the reduced YUV parts of the RGB signal as stated above.

The following is an example using the present invention. If we have, say, a yellow signal, originally: R=+1, G=+1, B=+0, this is transmitted as Y=+0.886, U=−0.500, V=+0.081. If we then set our contrast to 1.50*, then the signals become Y=+1.329, U=−0.750, V=+0.122. This would lead to R=+1.500, G=+1.500, B=+0.000. But let's say that RGB may be no larger than +1.000, then they have to be reduced again by a factor of 1.50*. We could simply locally reduce the contrast back again. This would lead to R=+1.000, G=+1.000, B=+0.000.

According to the present invention we first calculate that our overdrive factor is 1.50. We then reduce first the contributions from UV to RGB by a common factor of (no larger than) $1/1.50$*. The common factor preserves the hue, only the saturation is reduced. It is as if we now have Y=+1.329, U=−0.500, V=+0.081. This would lead to R=+1.443, G=+1.443, B=+0.443. We now have an overdrive factor of 1.443*. We then reduce all of RGB by a common factor of (no larger than) $1/1.443$*. The common factor preserves the hue and saturation, only the contrast is reduced. It is as if we now have Y=+0.921, U=−0.347, V=+0.056. As a result, our Y-signal is still 1.04* larger than it was originally. This leads to R=+1.000, G=+1.000, B=+0.307.

We have gained some 10% more light due to the contribution from the +0.307 signal in the blue channel after de-saturation. More importantly, we will see at least something changing in the peaks: if the contrast clips, then at least the saturation still changes. This makes for a more natural overdriven picture.

The example above was assuming hard-clipping: at least one of the RGB signals is driven as hard as possible, it is never reduced below +1.000. This has the disadvantage that all signals will be limited to the same maximum level, regardless of the original signal strength or the amount of overdrive. This leads to loss of detail (zero differential gain). One effect is known as "plastic faces".

Figure 2:
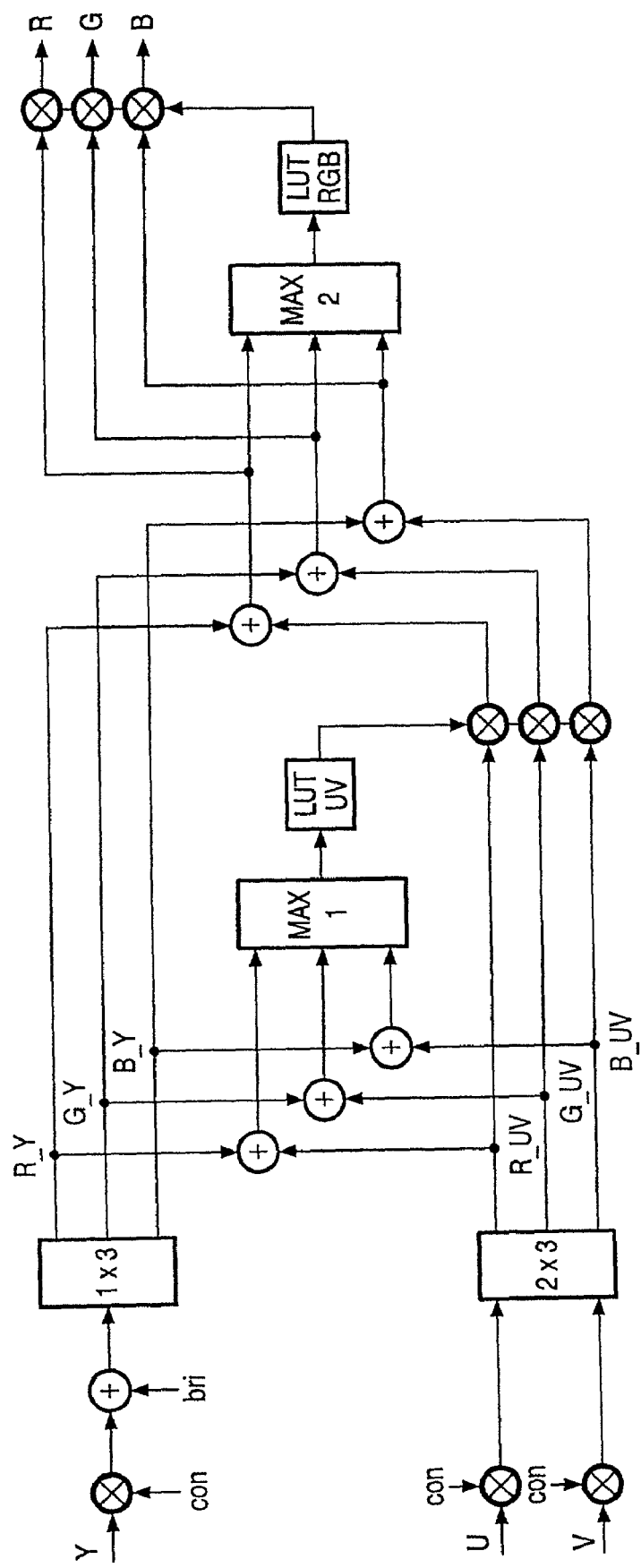
FIG. 2 shows the embodiment of the block diagram in FIG. 1, where lookup tables are introduced.

Alternatively we can apply soft-clipping. In FIG. 2 the embodiment of FIG. 1 is shown where soft clipping is introduced using lookup tables (LUT).

In such a lookup table different gain values are stored and are chosen according to the amplitude value of the maximum color in the set of basic colors to be reduced.

A digital time-discrete soft-clipper as mentioned above necessarily works in feed-forward fashion by:

Taking the maximum of the 3 input signals (usually RGB),

Using this as an entry to a lookup table for gain (or attenuation),

Multiplying each of the 3 inputs with the same gain (also referred to as 100% coupling).

100% coupling means that the ratio of the 3 input signals (R:G:B or Y:U:V) is not disturbed, so tint and (if you so choose) saturation are preserved. This is achieved by multiplying (R,G,B) or (Y,U,V) with the same factor.

The content of the lookup table determines the nature of the clipping by holding information, such as:

The gain for small input signals (typically it should be 1.0x==the maximum gain), The maximum amplitude for large input signals (typically it should be 100%), How soft or hard is the transition between constant gain (typically 1.0x) and constant output amplitude (100%, and then the differential gain is zero).

All this could be determined by a simple driver procedure that calculates the content of the lookup tables for the 2 clipper stages. The table stores gain is $1/256$ ... $256/256$. Note that the slope of the table is always $\leq 0$.

One lookup table curve could be divided into 32 segments, and only 32 values are actually stored. The value within a segment is then calculated in real-time by linear interpolation. Base and slope are stored into 2 separate lookup tables of 32 values of 8 bits each to speed up the interpolation. The slope is always negative (gain never increases) but it is stored as a positive value and later inverted. Also, an offset of +1 is added later to be able to reach gain =$256/256$=1.00x. Gain of 0.00x is not reachable.

Figure 3:
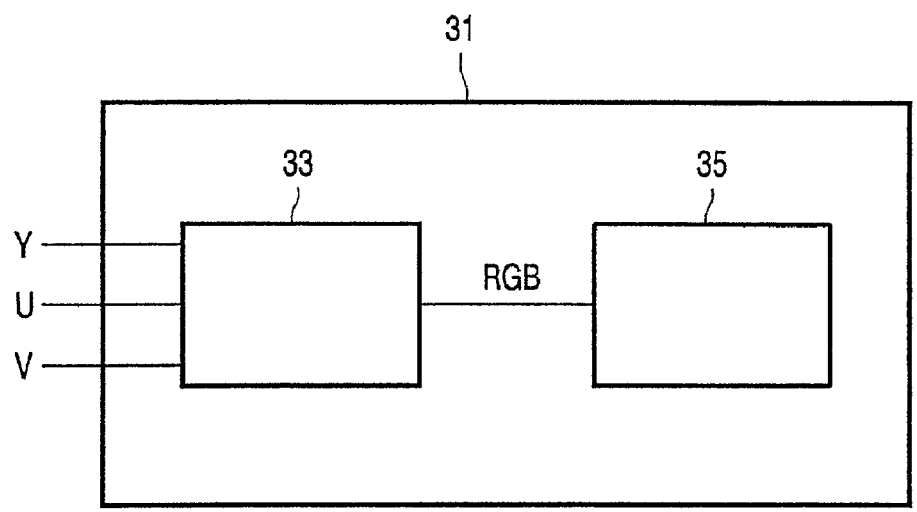
FIG. 3 shows a display apparatus comprising a display and a processing device.

FIG. 3 shows a display apparatus 31 according to the present invention comprising a processing device 33 and a display 35. The display apparatus could be a television, monitor etc.

Figure 4A:
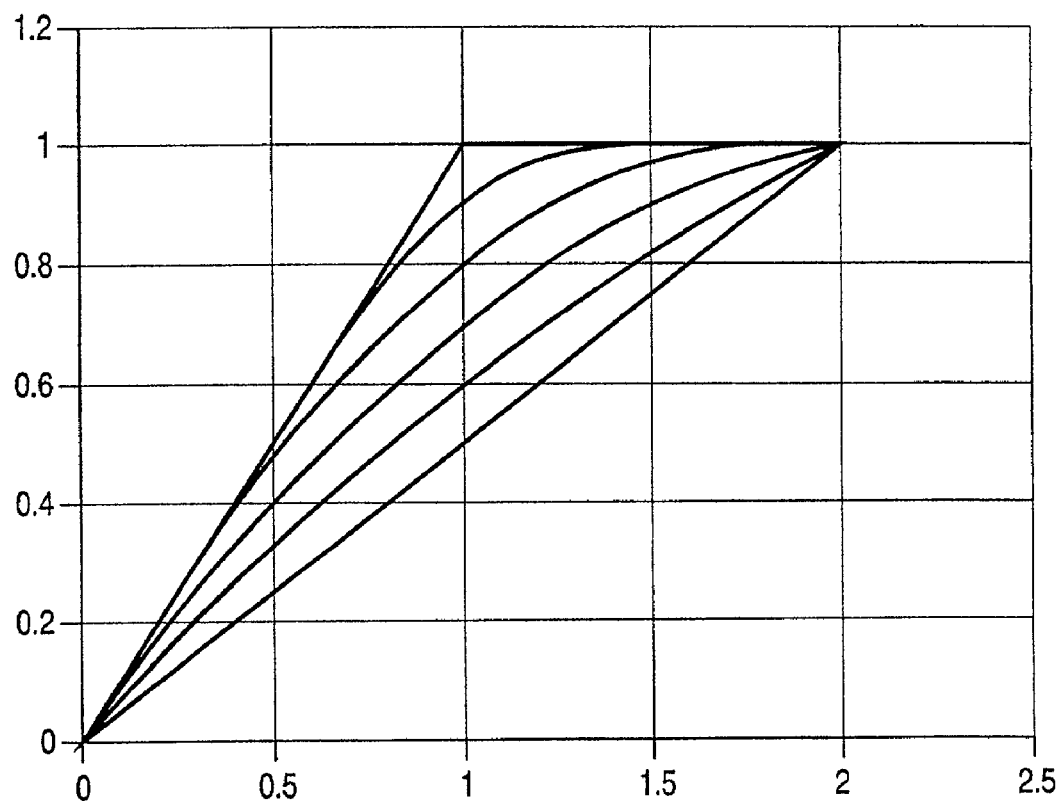
FIG. 4A–B show clipping characteristics varying from very soft to hard.
Figure 4B:
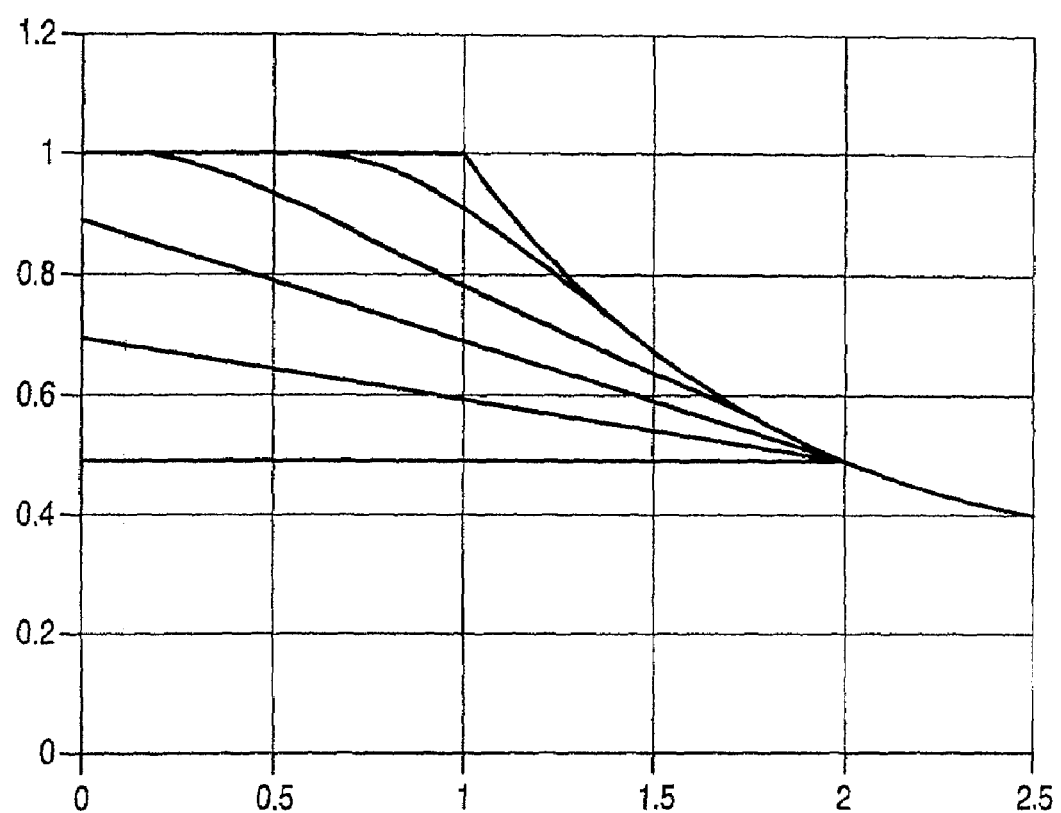

FIGS. 4A–B show clipping characteristics varying from very soft to hard, FIG. 4A shows the output signal as a function of the largest input signal, and FIG. 4B shows the multiplication factor as a function of the largest input signal. The figure shows a graph of the input-output transfer function of the clipper, while varying the hardness of the clipping. The lookup table will not contain this curve, it will contain a gain factor: gain=output/input. This is then used in: output=gain*input. It is seen how the clipping characteristics vary from very soft to very hard. Hard-clipping is typically allowed only on small peaks, such as subtitles. In the presence of large bright areas, particularly faces, it is then tuned to softer clipping, and/or the global contrast value must be reduced.

As also shown in FIG. 4A, with soft clipping we start earlier with reducing the gain, even before one of the R,G,B-signals is overdriven; and as the signal is overdriven more, we will reduce the gain some more.

The placement of these lookup tables in the embodiment described in FIG. 1 is shown in FIG. 2 (LUT UV and LUT RGB). Especially for the second one (LUT RGB or the contrast reduction) it is advantageous to program a softer characteristic. Thus we are spreading the pain: the differential gain, being the variation of the output signal divided by the variation of the input signal, is not suddenly reduced to zero. Instead we are reducing the gain earlier than necessary. Only at hard overdrive do we reach the maximum output level, we are sacrificing a bit of light output to make a more natural image. We are preserving some details in bright areas.

The saturation reduction in the first stage makes the highest of (R,G,B) lower, and the others higher. This means that less contrast reduction needs to be made at the second stage. The end result is fewer artifacts due to hard contrast clipping, as well as getting a bit more brightness on the screen.

In one embodiment the 2 lookup tables are not implemented as full tables. Instead they each use a sparse table and a linear interpolator. This saves on memory size while not essentially reducing the flexibility. An example in C code of an implementation of a lookup table for the contrast reduction is shown below:

```
/* Determine RGB soft-clipping factor:   */
T1 = (G > R);                    /* 1 ==> max(R,G) = G */
T2 = (B > (T1 ? G : R));         /* 1 ==> max(R,G,B) = B */
M = (T2 ? B : (T1 ? G : R));     /* M = max(R,G,B) */
M = UCLIP(M, 2047);              /* 11-bits unsigned */
idx = M >> 5;                    /* idx = M[10:5] */
rem = M & 0x1F;                  /* rem = M[4:0] */
F = RGB_base[idx] - ((RGB_delta[idx] * rem + 16) >> 5) + 1;
```

Input to the lookup table is an 11-bit number M. This is split into a 6-bit MSB part idx and a 5-bit LSB part rem. The index idx is used to address two lookup tables of 64 entries of 8-bits each. One table contains a base; the other contains a slope (delta). The remainder rem is used to make a linear interpolation to produce F:

$$F=base-delta*rem+1.$$

Then F is a number between 1 and 256 (inclusive).

In this example minus is used in the interpolation in the interpolator because the content of the clipping table is always decreasing, and then only non-negative numbers for delta are stored.

The factor F is determined from input signals R,G,B and applied to output signals R,G,B, so there is not a feedback path as in U.S. Pat. No. 5,349,390, where the factor F would be determined from the output signals R,G,B.

In order to prevent clipping in large areas of the picture and thereby avoid losing details of facial texture, the present invention introduces a "faces detector". It measures how large a fraction of the output signal is in the upper regions of the signal range, where the soft-clipper may be set to a low differential gain. This is an indication of loss of details in large areas, e.g. facial texture. There is a non-linear (horizontal) low-pass filter in the path to pass only information from large bright areas and to ignore small bright peaks, like subtitles. The way it functions is by means of a reverse peak detector: it resets quickly on dark pixels (between the subtitles) and it follows bright pixels slowly. They can only be counted, if a sufficient number of consecutive pixels are bright then. The speed with which the filter follows consecutive white is programmable: the maximum up-going slope of an integrator is set.

Figure 5:
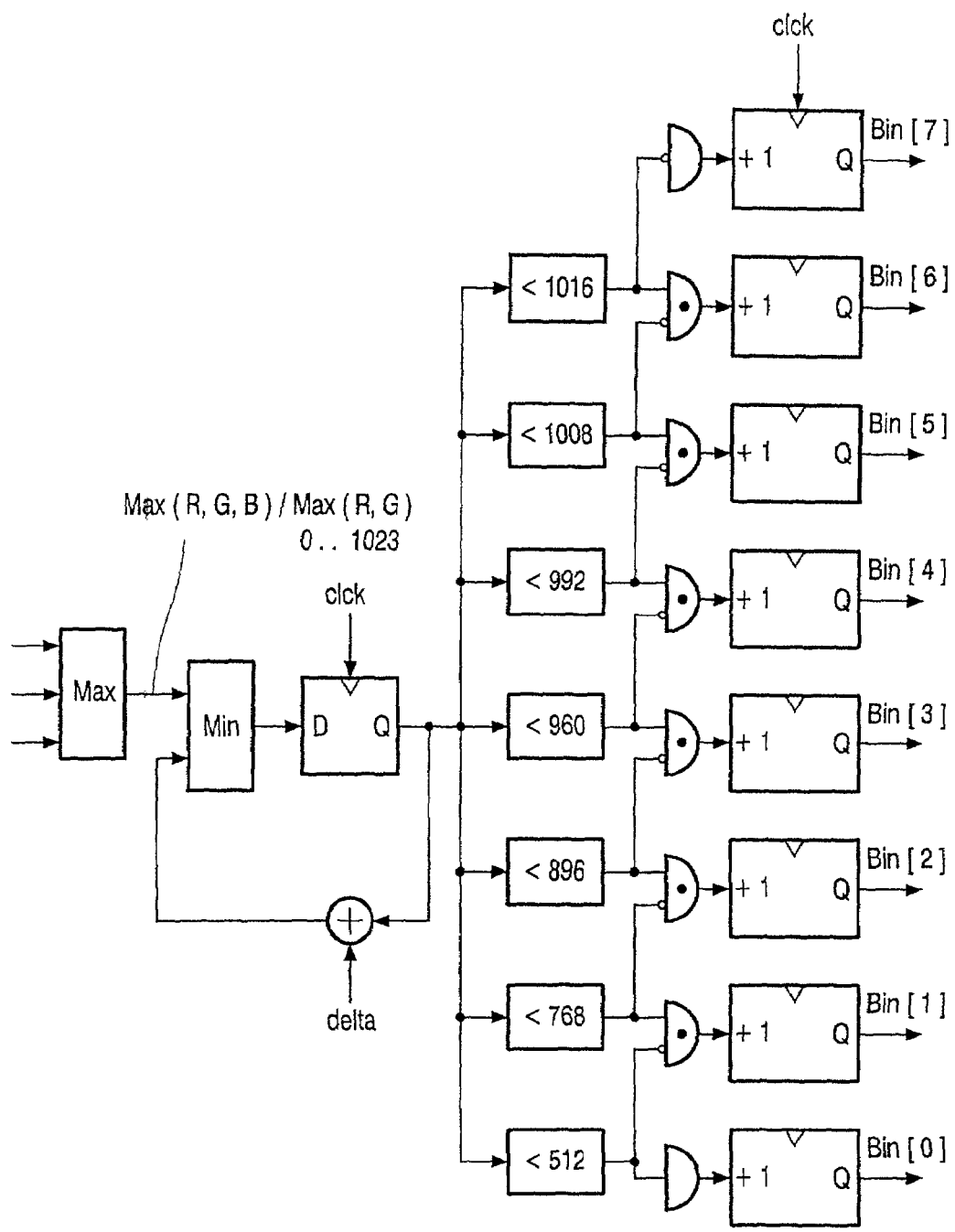
FIG. 5 shows a block diagram of an embodiment of the detector for large area overdrive conditions of the present invention.

FIG. 5 shows a block diagram of an embodiment of the detector for large area overdrive conditions of the present invention, this embodiment is based on non-linear filtering.

The peak-drive measurement is presented as a small (8-bins) histogram. This gives more relevant information than a single peak-drive value. The bins' borders are at $\frac{1}{2}$, $\frac{3}{4}$, $\frac{7}{8}$, $\frac{15}{16}$, $\frac{31}{32}$, $\frac{63}{64}$ and $\frac{127}{128}$ of the output range. It is very likely that the contact of the RGB soft-clipper lookup table will be programmed such that the differential gain reduces to zero as the signal output approaches 100%. Thus the non-linear histogram gives a good indication of what percentage of the picture falls into the top part of the clipper transfer curve where the differential gain is low (too low). A real-time software algorithm will read and interpret this and reduce global contrast or apply other remedies to preserve faces. Again, this is an implementation of the desired co-operation between a fast and local contrast reduction (the clipper) and a slow and global contrast reduction (the modified peak drive limiter).

The above-described filter looks only for correlation in the horizontal direction. The histogram will tell you how large an area of the picture is affected, meaning that it also contains some information about the vertical direction, even if this is not explicitly determined by any filter.

Figure 6:
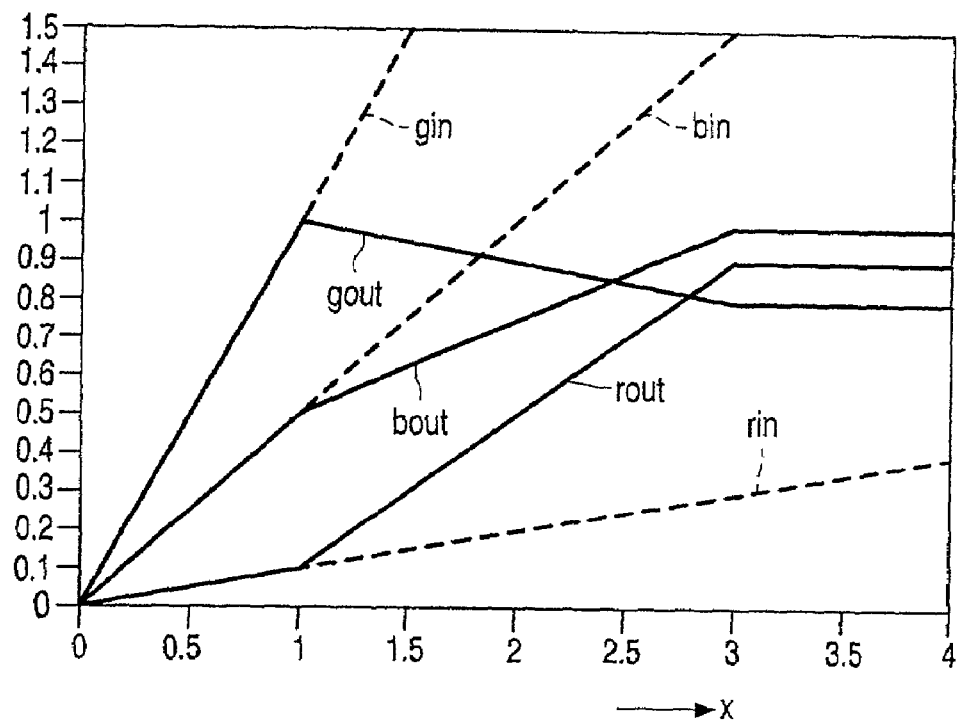
FIG. 6 shows the RGB values as a function of the maximum of the RGB values according to another version of a clipper.

Contrast reduction and desaturation can also be combined as explained in the following, which is another embodiment of the invention. In FIG. 6 we see values of the sub signals R, G, B as functions of the maximum contrast value, for simplicity 1 is the maximum contrast value for R, G, B in this example. When the sub signals is below clipping level (x<1), a processed signal going to the electronic video display is equal to the sub signals. If x>3, meaning that at least one of the sub signals is over three times too high to remain in the non-clipping region, the output will be a constant "peak white" of which we can choose the exact composition of R, G, B. For intermediate input signals (1<x<3) the output is a mix (i.e. it can be linear interpolation) of the x=1 triplet and the peak-white triplet. Thereby in the clipping region (1<x) we have higher output signals due to the addition of white (de-saturation); at the same time we get a much more correct color hue and a selectable hue of the ultimate saturation "peak white" (=limit for large x).

The processing shown in FIG. 6 could be carried out in the "linear-light domain" or alternatively in the "gamma-corrected signal domain". In the "linear-light domain" the signals correspond linearly to the luminance output (measured in cd/m$^2$). In the "gamma-corrected signal domain" the signals correspond to luminance$^{0.45}$ approximately. The first solution (linear-light domain) gives the physically correct way of desaturation: if the input signal would go from x=1 to x=3, the CIE (International commission on illumination) color co-ordinates of the output would follow a straight line in the CIE xy diagram. If however the processing were carried out in the gamma-corrected domain, the co-ordinates of the output would be a curved line in CIE xy space. The value x=3 mentioned in the examples is only a first embodiment and has given nice results with processing in linear light domain; comparable results with gamma-corrected signal processing, x=3$^{0.45}$=1.64, should be used instead of x=3.

Figure 7:
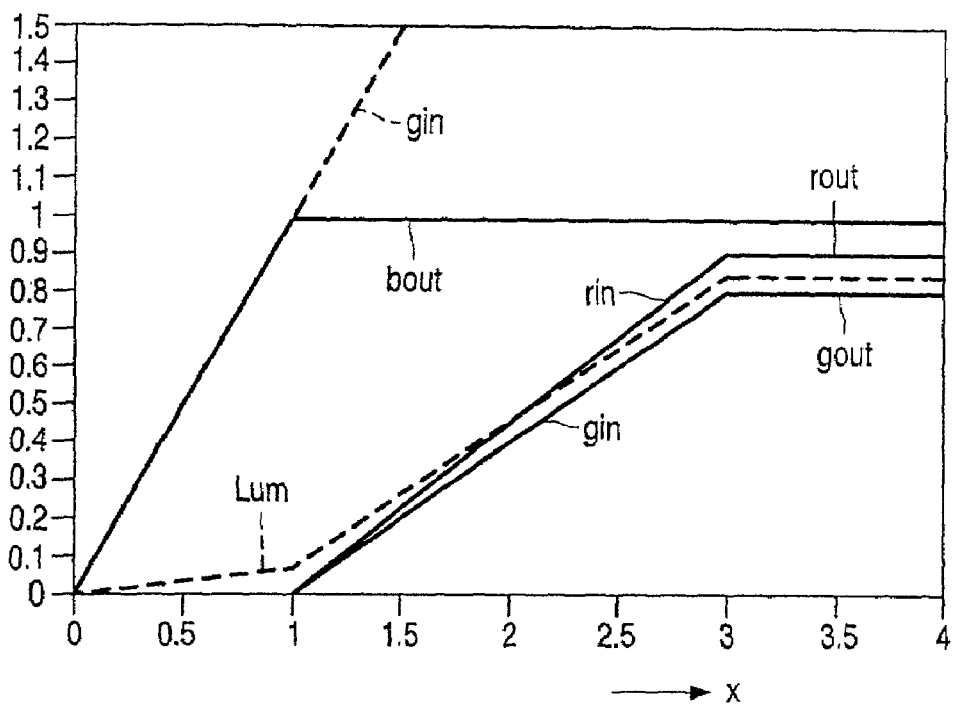
FIG. 7 shows the RGB values as a function of the maximum of the RGB values according to another clipper, where the color changes from black to blue in a linear ramp.

One problem in the above process is that if we look at a blue wedge (a linear ramp from black to blue), we see that for the part of the wedge that clips (and de-saturates) the luminance rises much too fast. In FIG. 7 we see the luminance Lum=0.21*R+0.72*G+0.07*B in case of a purely blue input signal. For x<1 we see the luminance (dotted line) rise slowly, since blue contributes little to luminance. After clipping sets in, red and green are added, causing much faster rising luminance. A possible remedy for this undesired behavior is to extend the point x=xwhite where peak-white is reached (xwhite=3 in the FIGS.) to a higher value, such that the luminance never "bends upwards" at x=1. This processing will be more expensive; we now have to calculate xwhite for each incoming pixel. A method of reducing the expense is to assume that only green contributes to luminance; another and better alternative than calculating xwhite is to carry out the processing as follows:

From the sub signal calculate, set x as the value of the sub signal with the maximum value, then calculate a normalized color by dividing all sub signals with x, whereby the highest of the normalized colors equals 1. Then a 2D lookup table is used where the normalized color is used as input, and the number xwhite is output. Next a signal to be used as input in an electronic video display is calculated using the normalized sub signal and xwhite. In an example this can be done as:

```
if (x<1) then
{
        [Rout,Gout,Bout] = x * [rin,gin,bin];
} else if (x < xwhite)
{
        [Rout,Gout,Bout] = [rin,gin,bin] + (x-1)*1/(xwhite-1)*([Rw,Gw,Bw] - [rin, gin, bin]);
} else
{
        [Rout,Gout,Bout] = [Rw,Gw,Bw];
}
```

In one embodiment the factor 1/(xwhite-1) is implemented with a lookup table. An advantage of using a lookup table for xwhite is that we can easily choose xwhite very large for extremely saturated colors (lowest of (rin, gin, bin) close to zero). In that case the saturated colors will be prohibited to desaturate, even if their input strength (x) gets high.

Although the present invention has been described in connection with the preferred embodiment, it is not intended to be limited to the specific form set forth herein. On the contrary, it is intended to cover such alternatives, modifications, and equivalents, as can be reasonably included within the scope of the invention as defined by the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of controlling contrast in a first part of a picture, said picture being represented by a picture signal, said picture signal comprising a number of sub signals each holding color information for different areas of the picture, said color information being represented by a first set of basic colors, each of said basic colors having an amplitude, the method comprising:
   increasing (1) contrast by increasing the amplitudes of all basic colors in a selected sub signal representing that part of the picture to be contrast increased,
   determining (2–4) if an amplitude of one of said basic colors exceeds a predefined value, and
   reducing (2–4) saturation of said color information if an amplitude of one of said basic colors exceeds the predefined value.

2. A method according to claim 1, further comprising:
   reducing (6) contrast by reducing the amplitudes of all the basic colors in that sub signal representing the part of the picture to be contrast increased.

3. A method according to claim 2, wherein the reducing saturation step (2–4) comprises:
   splitting (2) the selected sub signal into at least two groups of color information, a first group of which representing both contrast and saturation, and a second group of which representing only contrast, and
   reducing (4) the signals of the first group of sub signals with a first value, and wherein the reducing contrast step (6) comprises:
   reducing all basic colors with a second value.

4. A method according to claim 3, wherein the step of splitting the selected sub signal into at least two groups of color information comprises the step (2) of transforming the selected sub signal from being represented by the first set of basic colors to a second set of basic colors.

5. A method according to claim 3, wherein
   the first value is determined (4) by multiplying the reciprocal of the amplitude of that basic color having the highest amplitude and being above the predefined value with the predefined value, and wherein the reduction of saturation is performed by multiplying the amplitudes of the signals of the first group of sub signals with the first value, and
   the second value is determined (6) by multiplying the reciprocal of the amplitude of that basic color having the highest amplitude and being above the predefined value with the predefined value, and wherein the reduction of all basic colors is performed by multiplying the amplitudes of the signals of both the first and second group of sub signals with the second value.

6. A method according to claim 5, wherein the reciprocal of the amplitude of the basic color having the highest amplitude and/or the first value and/or the second value is/are are defined in lookup tables (LUT UV, LUT RGB).

7. A method according to claim 6, wherein the lookup table is implemented as a combination of at least one sparse table and at least one linear interpolator.

8. A method according to claim 1, wherein the steps of performing the reduction of saturation and performing the reduction of all basic colors are performed in a small insignificant part of the picture in which at least one amplitude of the basic colors exceeds the predefined value.

9. A method according to claim 8, further comprising contrast reduction of a large significant part of the picture in which at least one amplitude of the basic colors exceeds the predefined value.

10. A method according to claim 1, wherein the step of reducing saturation is performed by linearly reducing the amplitude of all basic color until at least one amplitude equals a predetermined amplitude value.

11. A signal processing device (33) for controlling contrast in a first part of a picture, said picture being represented by a picture signal, said picture signal comprising a number of sub signals each holding color information for different areas of the picture, said color information being represented by a first set of basic colors, each basic color having an amplitude, said signal processor comprising:

means (1) for increasing the contrast by increasing the amplitudes of the basic colors in the sub signal representing that part of the picture to be contrast increased, means (4) for determining if an amplitude of one of said basic colors exceeds a predefined value, and means (4) for reducing saturation of said color information if an amplitude of one of said basic colors exceeds the predefined value.

12. A display apparatus (31) comprising a display (35) and a signal processing device (33), the signal processing device being adapted to perform the method according to claim 1.

13. A computer program comprising a computer program code enabling a programmable device to perform the method according to claim 1.

14. A computer readable medium comprising a computer program according to claim 13.

* * * * *